US012670744B2

(12) United States Patent
Kim et al.

(10) Patent No.: US 12,670,744 B2
(45) Date of Patent: Jun. 30, 2026

(54) LOW-RESOLUTION FACE RECOGNITION DEVICE AND LOW-RESOLUTION FACE RECOGNIZER LEARNING DEVICE AND METHOD

(71) Applicant: ELECTRONICS AND TELECOMMUNICATIONS RESEARCH INSTITUTE, Daejeon (KR)

(72) Inventors: Hyungil Kim, Daejeon (KR); Minho Park, Daejeon (KR); Kang Min Bae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 433 days.

(21) Appl. No.: 18/313,152

(22) Filed: May 5, 2023

(65) Prior Publication Data

US 2023/0386252 A1 Nov. 30, 2023

(30) Foreign Application Priority Data

May 26, 2022 (KR) ........................ 10-2022-0064914

(51) Int. Cl.
*G06V 40/16* (2022.01)
*G06N 20/00* (2019.01)
(Continued)

(52) U.S. Cl.
CPC .......... *G06V 40/171* (2022.01); *G06N 20/00* (2019.01); *G06T 3/40* (2013.01); *G06V 10/32* (2022.01);
(Continued)

(58) Field of Classification Search
None
See application file for complete search history.

(56) References Cited

U.S. PATENT DOCUMENTS 5,764,816 A * 6/1998 Kohno .............. H04N 1/40068
358/448
9,161,686 B2 * 10/2015 Yonezawa ................. G06T 5/50
(Continued)

FOREIGN PATENT DOCUMENTS

CN 110647820 A * 1/2020 .............. G06N 3/08
JP 2021518597 A 8/2021
(Continued)

OTHER PUBLICATIONS

CN-110647820-A (Year: 2020).*
(Continued)

*Primary Examiner* — Chan S Park
(74) *Attorney, Agent, or Firm* — Rabin & Berdo, P.C.

(57) ABSTRACT

The present disclosure relates to a low-resolution face recognition device, which includes a high-resolution face image inputter; a low-resolution face image inputter; a high-resolution face feature extractor configured to extract a high-resolution face feature by using high-resolution and low-resolution face images; a face quality feature extractor configured to extract face quality features by using the high-resolution and low-resolution face images; a feature combiner configured to detect the high-resolution and low-resolution face features by concatenating the high-resolution face feature and the face quality feature; a feature adaptation network configured to extract a high-resolution face feature map and a low-resolution face feature map by using the detected high-resolution and low-resolution face features, respectively; and a consistency meter configured to determine a face ID by measuring consistency of a face feature map by using the extracted high-resolution and low-resolution face feature maps.

7 Claims, 8 Drawing Sheets

(51) Int. Cl.

| | | |
|---|---|---|
| *G06T 3/40* | (2006.01) |
| *G06V 10/32* | (2022.01) |
| *G06V 10/774* | (2022.01) |
| *G06V 10/80* | (2022.01) |
| *G06V 10/82* | (2022.01) |
| *G06V 10/98* | (2022.01) |

(52) U.S. Cl.
CPC .......... *G06V 10/774* (2022.01); *G06V 10/806* (2022.01); *G06V 10/82* (2022.01); *G06V 10/993* (2022.01); *G06V 40/168* (2022.01); *G06V 40/172* (2022.01); *G06T 2207/30201* (2013.01)

(56) References Cited

U.S. PATENT DOCUMENTS

| | | | | |
|---|---|---|---|---|
| 9,449,432 | B2 * | 9/2016 | Kanaujia | G06V 40/172 |
| 10,043,261 | B2 * | 8/2018 | Bhaskar | G06T 7/001 |
| 10,423,843 | B2 * | 9/2019 | Biemer | G06V 20/63 |
| 10,599,951 | B2 * | 3/2020 | Bhaskar | G06V 30/19173 |
| 11,068,741 | B2 * | 7/2021 | Wang | G06T 7/50 |
| 11,373,275 | B2 * | 6/2022 | Tai | G06N 3/045 |
| 11,869,170 | B2 * | 1/2024 | Berthelot | G06N 3/08 |
| 11,966,988 | B2 * | 4/2024 | Lakhani | G06T 7/001 |
| 12,210,587 | B2 * | 1/2025 | Levinshtein | G06V 10/82 |
| 2013/0315499 | A1 * | 11/2013 | Ju | H04N 23/64 |
| | | | | 382/255 |
| 2014/0185889 | A1 * | 7/2014 | Yonezawa | H04N 23/635 |
| | | | | 382/128 |
| 2015/0178554 | A1 * | 6/2015 | Kanaujia | G06T 19/20 |
| | | | | 382/118 |
| 2016/0247259 | A1 * | 8/2016 | Toyoda | G06T 3/4053 |
| 2017/0200265 | A1 * | 7/2017 | Bhaskar | G06T 7/0004 |
| 2018/0239972 | A1 * | 8/2018 | Biemer | G06V 20/582 |
| 2019/0043167 | A1 * | 2/2019 | Steyskal | G02B 27/0172 |
| 2019/0179960 | A1 | 6/2019 | Im et al. | |
| 2019/0205694 | A1 * | 7/2019 | Wang | G06V 40/165 |
| 2019/0303717 | A1 * | 10/2019 | Bhaskar | G06F 18/214 |
| 2019/0355103 | A1 * | 11/2019 | Baek | G06N 3/0895 |
| 2020/0175259 | A1 | 6/2020 | Noh et al. | |
| 2020/0258197 | A1 * | 8/2020 | Tai | G06N 3/09 |
| 2021/0166345 | A1 * | 6/2021 | Kim | G06T 3/4053 |
| 2021/0390320 | A1 * | 12/2021 | Lakhani | G06V 10/82 |
| 2021/0407042 | A1 | 12/2021 | Berthelot et al. | |
| 2022/0138500 | A1 | 5/2022 | Levinshtein et al. | |
| 2022/0180084 | A1 * | 6/2022 | Simpson | G06T 7/73 |
| 2023/0038498 | A1 * | 2/2023 | Xu | A61B 34/30 |
| 2024/0087086 | A1 * | 3/2024 | Hiasa | G06T 5/50 |

FOREIGN PATENT DOCUMENTS

| | | | |
|---|---|---|---|
| KR | 10-1382892 | B1 | 4/2014 |
| KR | 20160101973 | A | 8/2016 |
| KR | 10-2017-0074688 | A | 6/2017 |
| KR | 10-2329466 | B1 | 11/2021 |

OTHER PUBLICATIONS

Cong et al., "High-Resolution Image Harmonization via Collaborative Dual Transformations." arXiv preprint arXiv:2109.06671 (2022). (Year: 2022).*

Rivenson et al., "Deep Learning Microscopy." arXiv preprint arXiv:1705.04709 (2017). (Year: 2017).*

Yang et al., "Image super-resolution as sparse representation of raw image patches," 2008 IEEE Conference on Computer Vision and Pattern Recognition, Anchorage, AK, USA, 2008, pp. 1-8, doi: 10.1109/CVPR.2008.4587647. (Year: 2008).*

Ghosh et al., "Suprear-Net: Supervised Resolution Enhancement and Recognition Network," in IEEE Transactions on Biometrics, Behavior, and Identity Science, vol. 4, No. 2, pp. 185-196, Apr. 2022, doi: 10.1109/TBIOM.2022.3168584. (Year: 2022).*

Singh et al., "Semi-supervised super-resolution." arXiv preprint arXiv:2204.08192 (2022). (Year: 2022).*

Xu et al., "Face hallucination: How much it can improve face recognition," 2013 Australian Control Conference, Fremantle, WA, Australia, 2013, pp. 93-98, doi: 10.1109/AUCC.2013.6697254. (Year: 2013).*

Jing et al., "Feature super-resolution based facial expression recognition for multi-scale low-resolution faces." arXiv preprint arXiv:2004.02234 (2020). (Year: 2020).*

Isola et al., "Image-to-image translation with conditional adversarial networks." In Proceedings of the IEEE conference on computer vision and pattern recognition, pp. 1125-1134. 2017. (Year: 2017).*

Jia et al., "A Novel Semi-Supervised Deep Learning Framework for Affective State Recognition on EEG Signals," 2014 IEEE International Conference on Bioinformatics and Bioengineering, Boca Raton, FL, USA, 2014, pp. 30-37, doi: 10.1109/BIBE.2014.26. (Year: 2014).*

* cited by examiner

Figure 8:
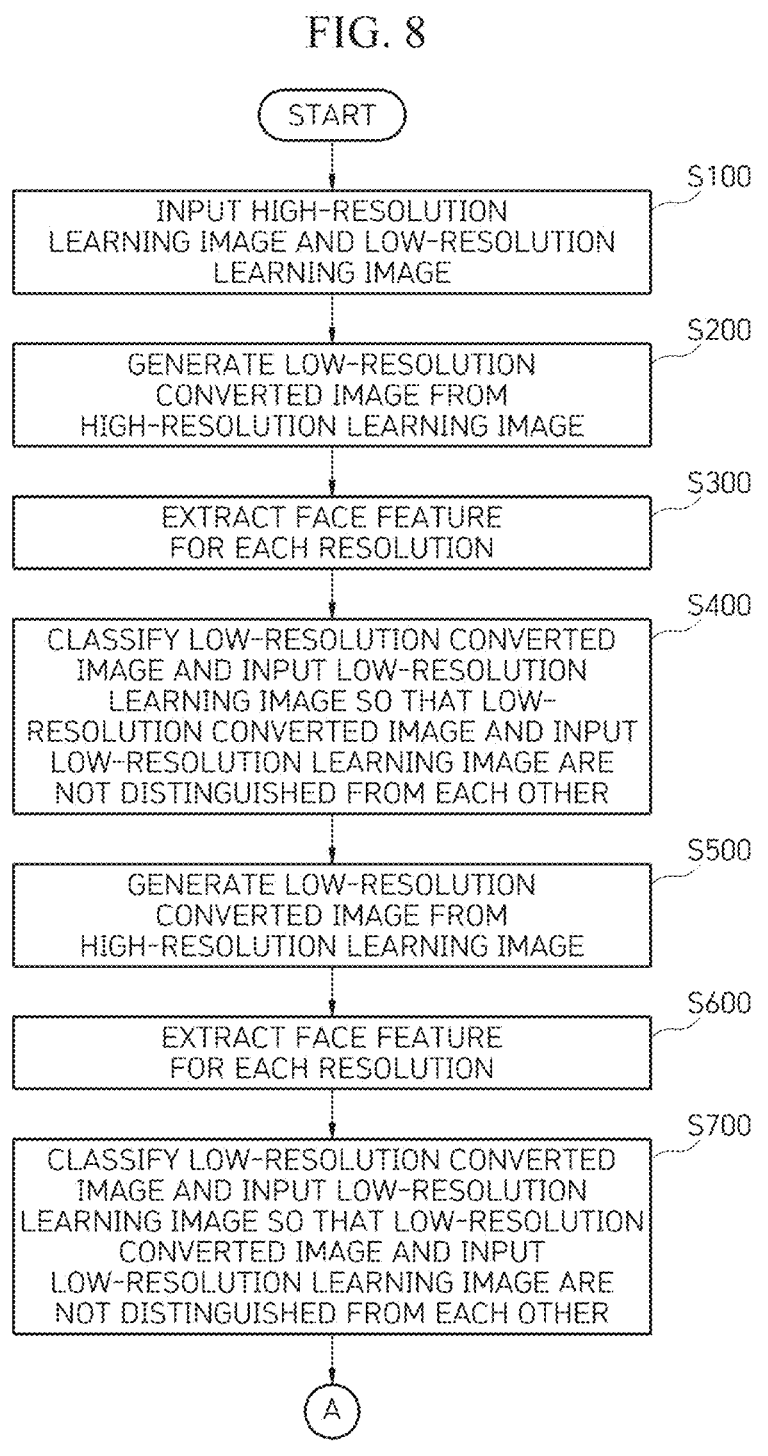

START

S100
INPUT HIGH-RESOLUTION
LEARNING IMAGE AND LOW-RESOLUTION
LEARNING IMAGE

S200
GENERATE LOW-RESOLUTION
CONVERTED IMAGE FROM
HIGH-RESOLUTION LEARNING IMAGE

S300
EXTRACT FACE FEATURE
FOR EACH RESOLUTION

S400
CLASSIFY LOW-RESOLUTION CONVERTED
IMAGE AND INPUT LOW-RESOLUTION
LEARNING IMAGE SO THAT LOW-
RESOLUTION CONVERTED IMAGE AND INPUT
LOW-RESOLUTION LEARNING IMAGE ARE
NOT DISTINGUISHED FROM EACH OTHER

S500
GENERATE LOW-RESOLUTION
CONVERTED IMAGE FROM
HIGH-RESOLUTION LEARNING IMAGE

S600
EXTRACT FACE FEATURE
FOR EACH RESOLUTION

S700
CLASSIFY LOW-RESOLUTION CONVERTED
IMAGE AND INPUT LOW-RESOLUTION
LEARNING IMAGE SO THAT LOW-RESOLUTION
CONVERTED IMAGE AND INPUT
LOW-RESOLUTION LEARNING IMAGE ARE
NOT DISTINGUISHED FROM EACH OTHER

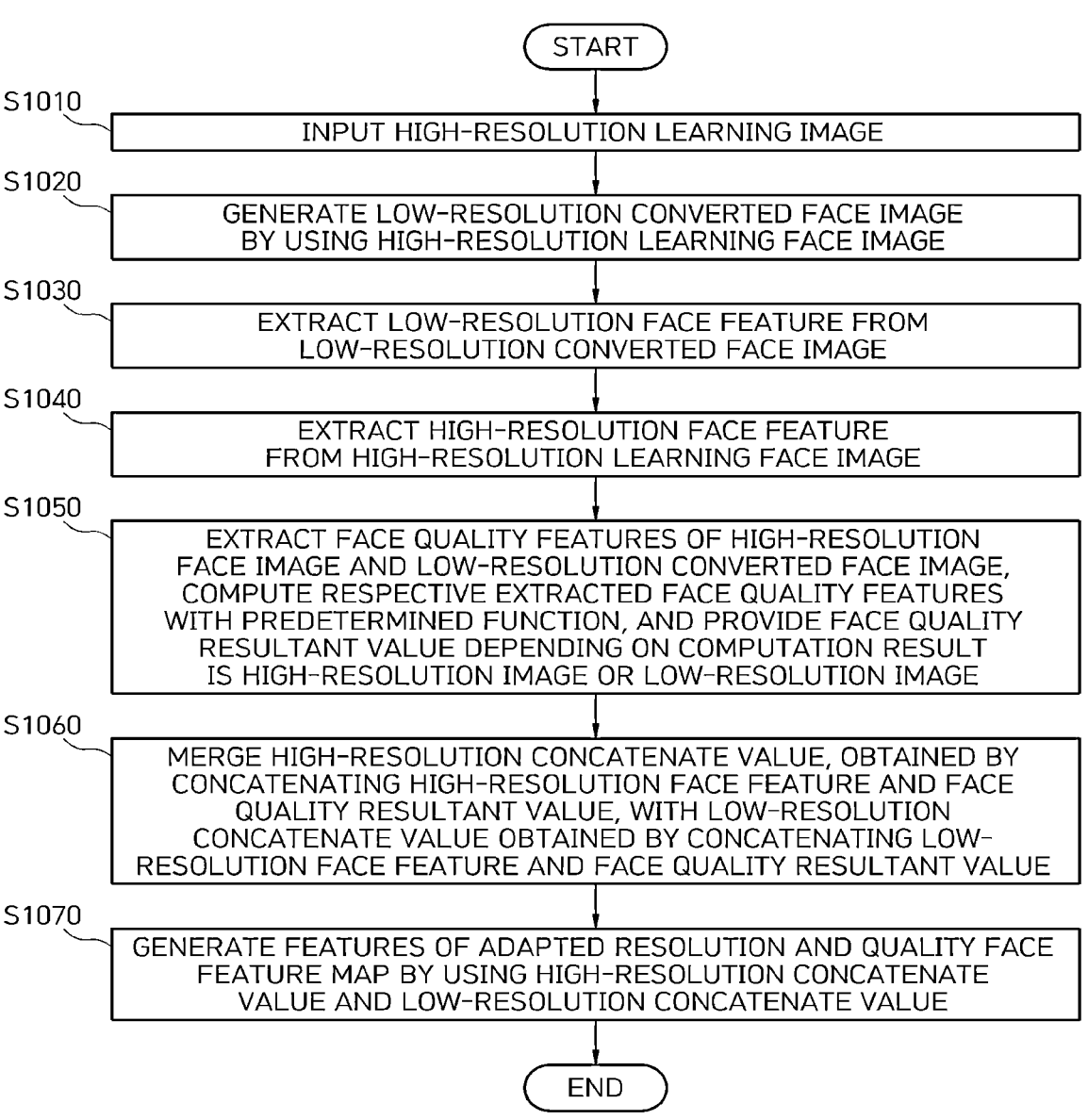

START

S1010    INPUT HIGH-RESOLUTION LEARNING IMAGE

S1020    GENERATE LOW-RESOLUTION CONVERTED FACE IMAGE BY USING HIGH-RESOLUTION LEARNING FACE IMAGE

S1030    EXTRACT LOW-RESOLUTION FACE FEATURE FROM LOW-RESOLUTION CONVERTED FACE IMAGE

S1040    EXTRACT HIGH-RESOLUTION FACE FEATURE FROM HIGH-RESOLUTION LEARNING FACE IMAGE

S1050    EXTRACT FACE QUALITY FEATURES OF HIGH-RESOLUTION FACE IMAGE AND LOW-RESOLUTION CONVERTED FACE IMAGE, COMPUTE RESPECTIVE EXTRACTED FACE QUALITY FEATURES WITH PREDETERMINED FUNCTION, AND PROVIDE FACE QUALITY RESULTANT VALUE DEPENDING ON COMPUTATION RESULT IS HIGH-RESOLUTION IMAGE OR LOW-RESOLUTION IMAGE

S1060    MERGE HIGH-RESOLUTION CONCATENATE VALUE, OBTAINED BY CONCATENATING HIGH-RESOLUTION FACE FEATURE AND FACE QUALITY RESULTANT VALUE, WITH LOW-RESOLUTION CONCATENATE VALUE OBTAINED BY CONCATENATING LOW-RESOLUTION FACE FEATURE AND FACE QUALITY RESULTANT VALUE

S1070    GENERATE FEATURES OF ADAPTED RESOLUTION AND QUALITY FACE FEATURE MAP BY USING HIGH-RESOLUTION CONCATENATE VALUE AND LOW-RESOLUTION CONCATENATE VALUE

END

LOW-RESOLUTION FACE RECOGNITION DEVICE AND LOW-RESOLUTION FACE RECOGNIZER LEARNING DEVICE AND METHOD

This application claims the benefit under 35 USC 119(a) of Korean Patent Application No. 10-2022-0064914, filed on May 26, 2022, the entire disclosure of which is incorporated herein by reference for all purposes.

BACKGROUND

1. Technical Field

The present disclosure relates to low-resolution face recognition device and method, and relates to a low-resolution face image generation method for modeling a low-resolution face image obtained in an actual environment, and deep learning-based feature adaptation device and method for reducing a feature gap between a model learned by large-scale high-resolution face image data required to secure distinctiveness between persons and a model learned by low-resolution face image data.

2. Related Art

A deep learning-based face recognition technology in the related art performs face recognition through a face matching process after extracting a face feature based on a learned model after learning a deep network by using a large-scale high-resolution face image.

As described above, the learned deep network learns a distinctive feature based on various pieces of texture information existing in a face image through learning based on a high-resolution face image.

However, an image obtained in an actual face recognition environment (e.g., CCTV) is input as a low-resolution image, and the face recognition performance deteriorates due to a mismatch of amounts of information between a model learned by a high-resolution face image and the input low-resolution image.

In order to deal with such a problem, the low-resolution image is used with the size thereof increased basically by using an image interpolation method, but even if the size is increased, the amount of information is unable to be increased, and thus the recognition performance is unable to be improved.

Further, although a super-resolution imaging technique may be used, a pair of high-resolution and low-resolution images does not exist in order to learn a super-resolution image model, and thus the learning is performed with respect to a low-resolution face that is obtained through the image interpolation method from a high-resolution face image.

That is, since various deterioration phenomena (e.g., compression artifact) occur in an actual low-resolution face image, the low-resolution image obtained by the interpolation method is limited in modeling the actual environment.

Recently, in order to deal with the low-resolution face recognition problem, a technology to learn a common feature of high-resolution and low-resolution faces has been researched, but since the modeling is performed with an image obtained by interpolating the low-resolution image, there is a problem in that there is a limit to modeling the actual low-resolution face image.

SUMMARY

The present disclosure has been devised to solve the problems in the related art, and provides a low-resolution face recognition device, which generates an actual low-resolution face image from a high resolution face image by using high-resolution and low-resolution face images that are not paired in order to model the low-resolution face image obtained in an actual environment.

Further, the present disclosure provides a low-resolution face recognition device, which learns a common feature by reducing a feature gap between domains having different resolutions by using a pair of a generated low-resolution face image and a high-resolution face image, and in particular, which performs learning so that matching is made in a middle domain between the feature obtained from the high-resolution image and the feature obtained from the low-resolution image other than performing learning to match the feature for the high-resolution face image with the low-resolution face image domain having insufficient information.

The present disclosure proposes a learning method, which can make a pair of high-resolution/low-resolution face images from a technique of generating an actual environmental low-resolution face image in order to reduce a mismatch between an input image and a model learned by a high-resolution face in a low-resolution face recognition environment, and can reduce a gap between two domains while keeping distinctiveness, and an object of the present disclosure is to provide a low-resolution face recognition device, which can improve the low-resolution face recognition performance in an actual environment.

The objects of the present disclosure are not limited to the above-described objects, and other unmentioned objects may be clearly understood by those skilled in the art from the following description.

According to an embodiment of the present disclosure to achieve the above object, a low-resolution face recognition device using a low-resolution image includes: a high-resolution face image inputter configured to input a high-resolution face image; a low-resolution face image inputter configured to input a low-resolution face image; a high-resolution face feature extractor configured to extract a high-resolution face feature by using the high-resolution face image and the low-resolution face image; a face quality feature extractor configured to extract face quality features by using the high-resolution face image and the low-resolution face image; a feature combiner configured to provide a high-resolution face feature by concatenating the high-resolution face feature and the face quality feature, and to provide a low-resolution face feature by concatenating the highlow-resolution face feature and the face quality feature; a feature adaptation network configured to extract a high-resolution face feature map and a low-resolution face feature map by using the detected high-resolution face feature and low-resolution face feature, respectively; and a consistency meter configured to determine a face ID by measuring consistency of a face feature map by using the extracted high-resolution face feature map and low-resolution face feature map.

According to an embodiment of the present disclosure, a face image recognizer learning device includes: an image inputter configured to input a high-resolution learning image and a low-resolution learning image each including a pre-registered face; a low-resolution image generator configured to generate a low-resolution converted image from the input high-resolution learning image; a low-resolution face feature extractor configured to extract a high-resolution face feature from the high-resolution learning image and to extract a low-resolution face feature from the generated low-resolution converted image; a low-resolution image classifier configured to distinguish the low-resolution converted image generated through the low-resolution image generator and the low-resolution learning image from each other; a high-resolution image generator configured to generate a high-resolution converted image by using the low-resolution converted image generated through the low-resolution image generator; a high-resolution face feature extractor configured to extract a high-resolution face feature from the high-resolution converted image generated through the high-resolution image generator and to extract a high-resolution face feature from the input high-resolution learning image; and a high-resolution image classifier configured to distinguish the high-resolution converted image generated through the high-resolution image generator and the high-resolution learning image from each other.

The face image recognizer learning device includes: a first perceptual loss function for using the extracted high-resolution face feature and the extracted low-resolution face feature to make the two face features equal to each other so that the two face features are distinguished as the same person; a first GAN loss function for processing the low-resolution converted image and low-resolution learning image classified through the low-resolution image classifier so that the low-resolution converted image and the low-resolution learning image are not distinguished from each other; and a first pixel consistency loss function for processing pixel values between the input high-resolution learning image and the generated low-resolution converted image so that the pixel values are consistent with each other, and the low-resolution image generator is learned through the first perceptual loss function, the first GAN loss function, and the first pixel consistency loss function.

The face image recognizer learning device includes: a second perceptual loss function for using the extracted high-resolution face feature and the extracted high-resolution converted face feature to make the two face features equal to each other so that the two face features are distinguished as the same person; a second GAN loss function for separating the high-resolution converted image and high-resolution learning image classified through the high-resolution image classifier from each other; and a second pixel consistency loss function for processing pixel values between the classified high-resolution converted image and high-resolution learning image so that the pixel values are consistent with each other, and the high-resolution image generator is learned through the second perceptual loss function, the second GAN loss function, and the second pixel consistency loss function.

The low-resolution image classifier is learned by using the first GAN loss function.

The low-resolution image classifier is learned by using the second GAN loss function.

According to another embodiment of the present disclosure, a face image recognizer learning device includes: a high-resolution learning image inputter configured to input a pre-registered high-resolution learning face image; a low-resolution image face generator configured to generate a low-resolution converted face image by using the input high-resolution learning face image; a low-resolution face feature extractor configured to extract a low-resolution face feature from the input low-resolution converted face image; a high-resolution face feature extractor configured to extract a high-resolution face feature from the input high-resolution learning face image; a face quality feature extractor configured to: extract face quality features by using the input high-resolution face image and the generated low-resolution converted face image, compute the respective extracted face quality features with a predetermined function, and provide a face quality resultant value depending on whether the computation result is a high-resolution image or a low-resolution image; a channel embedder configured to merge a high-resolution concatenate value, obtained by concatenating the high-resolution face feature and the face quality resultant value calculated through the face quality feature extractor, with a low-resolution concatenate value obtained by concatenating the low-resolution face feature and the face quality resultant value calculated through the face quality feature extractor; and a feature adaptation network configured to generate a feature of an adapted resolution and a quality face feature map by using the high-resolution concatenate value and the low-resolution concatenate value.

The low-resolution face image generator is configured to: generate the low-resolution converted image paired with the high-resolution face image, and extract the face features from the respective images.

A feature having rich expressiveness reflecting various textures is extracted as the high-resolution face feature.

A feature capable of expressing only overall face shape information is extracted as the low-resolution face feature.

The face quality feature extractor is configured to calculate the face quality resultant value in accordance with the resolution by performing a SoftMax function operation (Qs) on the extracted face quality feature.

The face quality feature extractor is configured to: return "1" if the face quality resultant value is the high-resolution image, and return "0" if the face quality resultant value is the low-resolution image.

According to an embodiment of the present disclosure, described are a technology for generating an actual low-resolution face image in order to reduce the feature gap between high-resolution/low-resolution images that are not paired with each other and a feature adaptation method for reducing the feature difference from high-resolution/low-resolution images that are paired with each other.

Accordingly, effective face recognition is possible by extracting an adapted feature from a low-resolution face image entering as an input from the real world when a face recognition model learned by a high-resolution face image is given.

Since various networks, such as a generator, a classifier, and a feature extractor, are used to learn the above-described model, but in a testing step, only the feature extractor and a specific adaptation network are utilized, big calculation overhead does not occur as compared with the existing face recognition deep network.

The present disclosure has an effect that it can be widely utilized in a CCTV-based low-resolution face recognition system that is a real world face recognition scenario.

BRIEF DESCRIPTION OF THE DRAWINGS

FIG. 2 is a configuration block diagram explaining a low-resolution face recognizer learning device according to an embodiment of the present disclosure.

FIG. 7 is a configuration block diagram explaining a low-resolution face recognizer learning device according to an embodiment of the present disclosure.

FIGS. 8 and 9 are a flowchart explaining an image generator learning method according to an embodiment of the present disclosure.

FIG. 10 is a flowchart explaining an adaptive model learning method of a face image recognizer according to an embodiment of the present disclosure.

DETAILED DESCRIPTION

The advantages and features of the present disclosure and methods for achieving the advantages and features will be apparent with reference to embodiments to be described in detail together with the accompanying drawings. However, the present disclosure is not limited to the embodiments disclosed below, but it can be implemented in various different forms. The embodiments are provided to complete the present disclosure and to assist those of ordinary skill in the art to which the present disclosure pertains in a complete understanding of the category of the present disclosure, and the present disclosure is only defined by the scope of the appended claims. Meanwhile, terms used in the description are to explain the embodiments, but are not intended to limit the present disclosure. In the description, unless specially described on the contrary, the constituent element(s) may be in a singular or plural form. The term "comprises" and/or "comprising" used in the description should be interpreted as not excluding the presence or addition of one or more other constituent elements, steps, operations, and/or elements in addition to the mentioned constituent elements, steps, operations, and/or elements.

Figure 1:
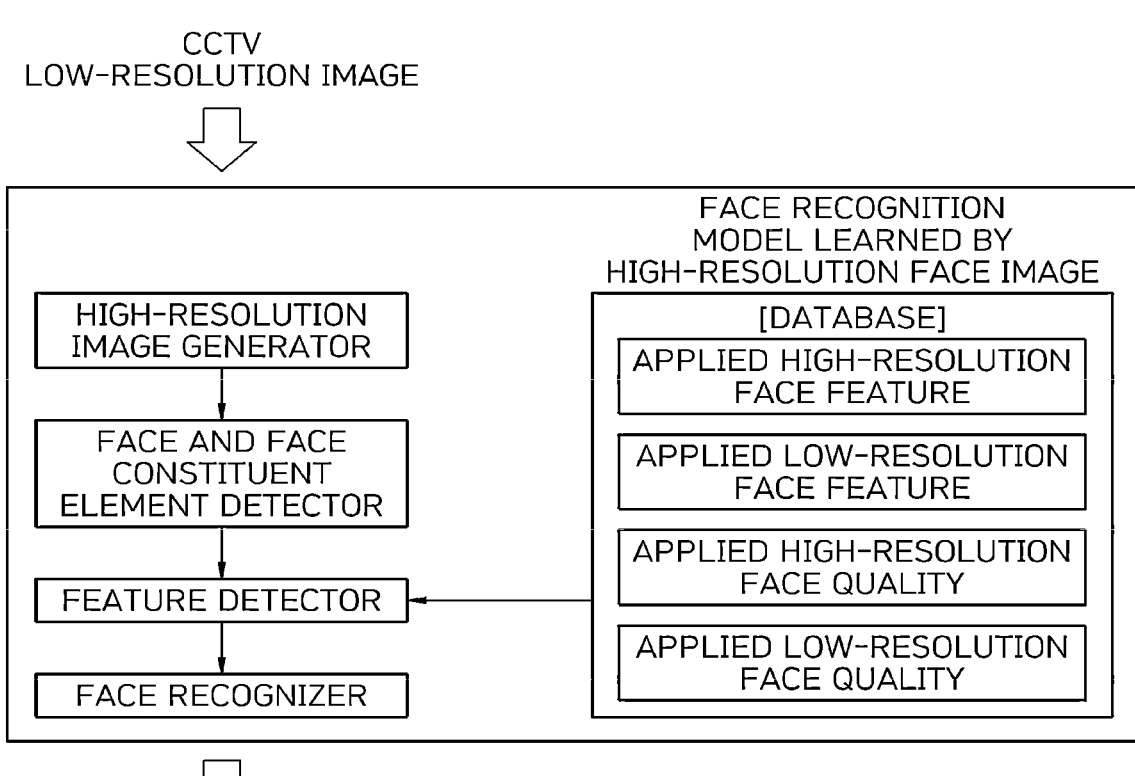
FIG. 1 is a configuration block diagram explaining a low-resolution face recognition device according to an embodiment of the present disclosure.

A low-resolution face recognition device according to an embodiment of the present disclosure is briefly a device for modeling an actual low-resolution face image. FIG. 1 is a configuration block diagram explaining a low-resolution face recognition device according to an embodiment of the present disclosure.

As illustrated in FIG. 1, the low-resolution face recognition device according to an embodiment of the present disclosure includes a high-resolution image generator, a face and face constituent element detector, a feature detector, a face recognizer, and a database.

The low-resolution image generator converts a low-resolution image input through a CCTV into a low-resolution converted image.

The face detector and face constituent element detector detects a face and face constituent elements (eyes, nose, and mouth) from the low-resolution converted image.

The feature detector performs one or more of preprocessing, such as rotation and illumination correction of the detected face and face constituent elements, and extracts features between the respective face constituent elements by comparing them with the face features and face qualities stored in the database.

The face recognizer recognizes a face by using the features between the extracted face constituent elements.

By an adaptive model learning device, the database stores and learns an adapted high-resolution face feature, an adapted high-resolution face quality, an adapted low-resolution face feature, and an adapted low-resolution face quality which are detected by concatenating or synthesizing a high-resolution face image, a low-resolution converted face image generated through the high-resolution face image by a learned low-resolution image generator, and face quality feature information extracted through the high-resolution face image and the low-resolution converted face image.

Figure 2:
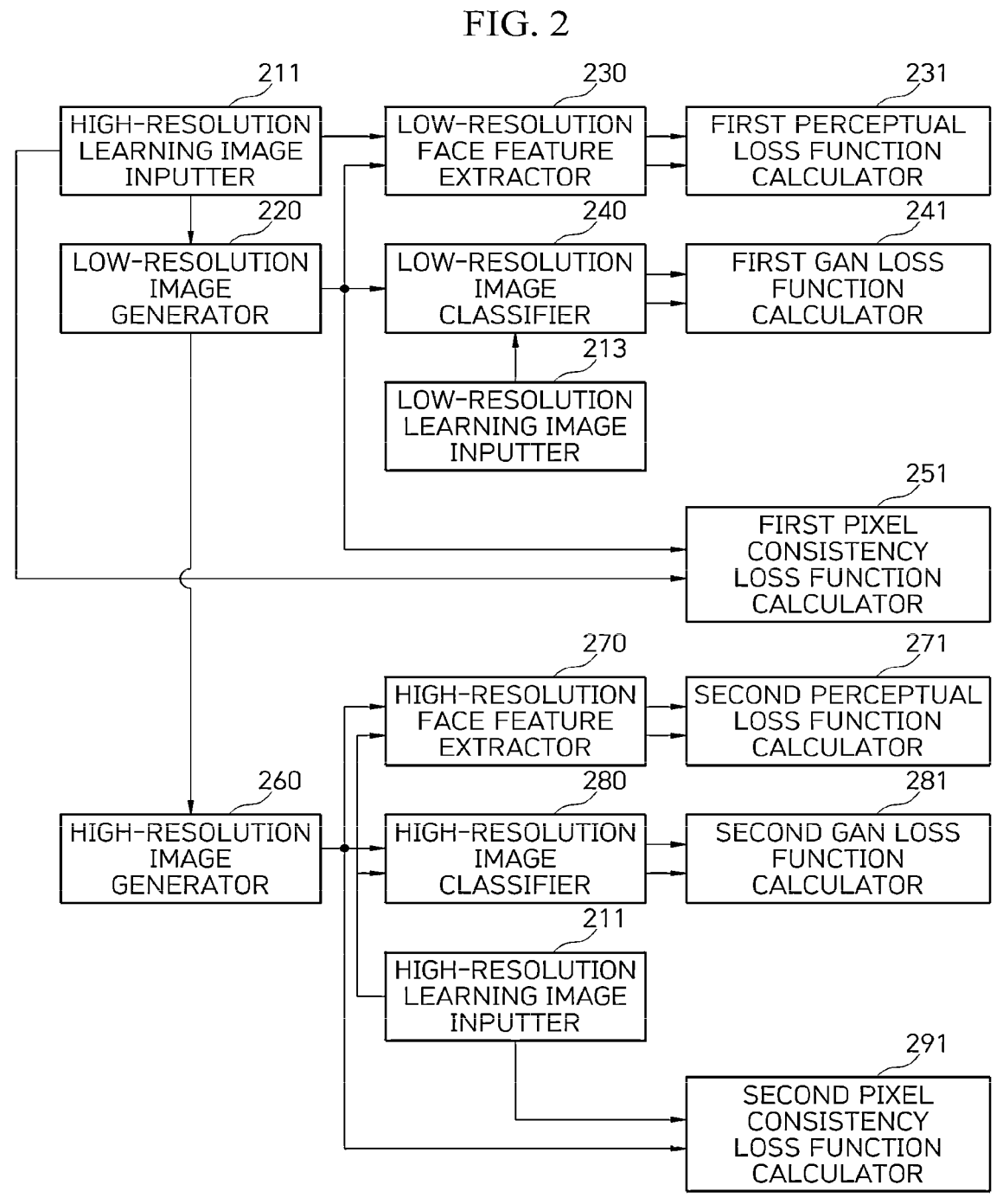

FIG. 2 is a configuration block diagram explaining a face image recognizer learning device according to an embodiment of the present disclosure.

As illustrated in FIG. 2, the face image recognizer learning device according to an embodiment of the present disclosure includes a high-resolution learning image inputter 211, a low-resolution learning image inputter 213, a low-resolution image generator 220, a low-resolution face feature extractor 230, a first perceptual loss function 231, a low-resolution image classifier 240, a first GAN loss function 241, a first pixel consistency loss function 251, a high-resolution image generator 260, a high-resolution face feature extractor 270, a second perceptual loss function 271, a high-resolution image classifier 280, a second GAN loss function 281, and a second pixel consistency loss function 290.

The high-resolution learning image inputter 211 inputs a high-resolution learning image including a pre-registered face to the low-resolution image generator 220. The low-resolution learning image inputter 213 inputs a low-resolution learning image including the pre-registered face to the low-resolution image classifier 240. Here, the high-resolution learning image inputter 211 is provided with a high-resolution image set, and the low-resolution learning image inputter 213 is provided with a low-resolution image set that is not paired with the high-resolution image set.

The low-resolution image generator 220 generates a low-resolution converted image from the high-resolution learning image input through the high-resolution learning image inputter 211, and inputs the generated low-resolution converted image to the low-resolution face feature extractor 230 and the low-resolution image classifier 240. Further, on the assumption that the high-resolution image set and the low-resolution image set, which are not paired with each other, exist, the low-resolution image generator 220 generates the low-resolution converted image by using the high-resolution learning image. In this case, the low-resolution image generator 220 is a deep network having an encoder-decoder structure, and is composed of 12 residual blocks. Meanwhile, ID information of an image obtained through the low-resolution image generator 220 is used for learning as a feature obtained from the deep network learned by a ResNet50 model for face recognition.

The low-resolution face feature extractor 230 extracts a high-resolution face feature through the input high-resolution learning image, and extracts a low-resolution face feature through the low-resolution converted image. In an embodiment of the present disclosure, the face feature extractor may extract the high-resolution face feature by using various face features, such as face feature, texture, and skin color. Here, the face feature extractor may detect the face by using information such as sizes and shapes of face feature components, such as an eye, nose, mouth, outline, and contrast, correlation, face color, and texture, and information in the mixed form of the components. Further, the high-resolution image generator 260 is the deep network having the encoder-decoder structure, and is composed of 12 residual blocks. Further, the low-resolution face feature extractor 230 obtains identity information of a converted image obtained from the deep network learned by the ResNet50 model for face recognition through the generator, and utilizes the information for learning.

The low-resolution image classifier 240 classifies the low-resolution learning image by using the low-resolution converted image generated through the low-resolution image generator 220 and the low-resolution learning image input through the low-resolution learning image inputter 213. The low-resolution image classifier 240 distinguishes low-resolution learning images of a set 110 of a low-resolution converted image generated through the low-resolution image generator 220 and the original low-resolution image by using an adversarial learning method.

The high-resolution image generator 260 generates the high-resolution converted image by using the low-resolution converted image generated through the low-resolution image generator 220, and inputs the generated high-resolution converted image to the high-resolution face feature extractor 270 and the high-resolution image classifier 280.

The high-resolution face feature extractor 270 extracts the high-resolution face feature from the high-resolution converted image generated through the high-resolution image generator 260, and extracts the high-resolution face feature from the input high-resolution learning image.

The high-resolution image classifier 280 performs classification by using the high-resolution converted image generated through the high-resolution image generator 260 and the high-resolution learning image. Further, the high-resolution image classifier 280 distinguishes the high-resolution image generated through the low-resolution converted image generated through the high-resolution image generator 260 from the original high-resolution image by using the adversarial learning method.

In an embodiment of the present disclosure, the high-resolution face image inputter 210, the low-resolution image generator 220, the low-resolution face feature extractor 230, the low-resolution image classifier 240, the high-resolution image generator 260, the high-resolution face feature extractor 270, and the high-resolution image classifier 280, which constitute the face image recognizer learning device, are all composed of deep networks, and utilize the generative adversarial neural network learning technology for effective image generation.

Further, in order to learn parameters of deep networks, the face image recognizer learning device according to an embodiment of the present disclosure includes pixel consistency loss functions $$\left(L_{pix}^{HL} \text{ and } L_{pix}^{LH}\right)$$

251 and 291 to restore the face image well, generative adversarial network (GAN) loss functions $$\left(L_{GAN}^{HL} \text{ and } L_{GAN}^{LH}\right)$$

241 and 281 to generate an actual face image while tricking the classifier, and perceptual loss functions $$\left(L_{id}^{HL} \text{ and } L_{id}^{LH}\right)$$

231 and 271 to keep person's identity information. and

As an example, the low-resolution converted image generated by the low-resolution image generator ($G_{HL}$) 220 from the i-th high-resolution learning image $$\left(x_H^i\right)$$

sampled by the high-resolution learning image inputter 211 is denoted by $$\hat{x}_L^i = G_{HL}\left(x_H^i, e\right).$$

In this case, noise (e) is used to include various environmental changes.

Further, the high-resolution converted image generated by the high-resolution image generator ($G_{LH}$) 260 is denoted by $$\hat{x}_H^i = G_{LH}(\hat{x}_L^i).$$

The first perceptual loss function 231 uses the high-resolution face feature and the low-resolution face feature, extracted from the low-resolution face feature extractor 230, to make the two face features equal to each other so that the two face features are distinguished as the same person, and as in Mathematical expression 1 below, it is defined by a distance between features extracted from the low-resolution face feature extractor 230.

$$\mathcal{L}_{id}^{HL} = \frac{1}{n_H}\sum_{i=1}^{n_H}\left\|I\left(x_H^i\right) - I(\hat{x}_L^i)\right\|_2^2 \qquad \text{[Mathematical expression 1]}$$

The first generative adversarial network (GAN) loss function 241 processes the low-resolution converted image and the low-resolution learning image classified through the low-resolution image classifier 240 so that the low-resolution converted image and the low-resolution learning image are not distinguished from each other, and as in Mathematical expression 2 below, it is defined as calculating an expected value of a value obtained by multiplying the generated result of the low-resolution image classifier ($D_{HL}$) 240 by −1.

$$\mathcal{L}_{GAN}^{HL} = \mathbb{E}_{\hat{x}_L^i \sim \mathbb{P}_L^g}\left[-D_{HL}(\hat{x}_L^i)\right] \qquad \text{[Mathematical expression 2]}$$

The first pixel consistency loss function 251 processes pixel values between the input high-resolution learning image and the generated low-resolution converted image so that the pixel values are consistent with each other, and as in Mathematical expression 3 below, it is defined as calculating a difference between a down-sampled (S) version of the original high-resolution learning image and the low-resolution converted image.

$$\mathcal{L}_{pix}^{HL} = \frac{1}{n_H}\sum_{i=1}^{n_H}\left\|S\left(x_H^i\right) - \hat{x}_L^i\right\|_2^2, \qquad \text{[Mathematical expression 3]}$$

$$\text{where } \hat{x}_L^i = G_{HL}\left(x_H^i, e\right)$$

Here, $$\mathcal{L}_{pix}^{HL}$$

is a pixel consistency resultant value of the low-resolution image.

The second perceptual loss function 271 uses the extracted high-resolution face feature and the extracted high-resolution converted face feature input thereto to make the two face features equal to each other so that the two face features are distinguished as the same person, and as in Mathematical expression 4 below, it is defined by a distance between features extracted from the high-resolution face feature extractor 270.

$$\mathcal{L}_{id}^{HL} = \frac{1}{n_H}\sum_{i=1}^{n_H}\left\|I(x_H^i) - I(\hat{x}_H^i)\right\|_2^2 \qquad \text{\{Mathematical expression 4\}}$$

The second GAN loss function 281 processes the high-resolution converted image and the high-resolution converted image classified through the high-resolution image classifier 280 and the high-resolution learning image so that the high-resolution converted image and the high-resolution learning image are not distinguished from each other, and as in Mathematical expression 5 below, it is defined as calculating an expected value of a value obtained by multiplying the result of the high-resolution image classifier ($D_{HL}$) 280 by −1.

$$\mathcal{L}_{GAN}^{LH} = \mathop{\mathbb{E}}_{\hat{x}_H^i \sim \mathbb{P}_H^g}\left[-D_{LH}(\hat{x}_H^i)\right] \qquad \text{\{Mathematical expression 5\}}$$

The second pixel consistency loss function 291 processes pixel values between the classified high-resolution converted image and the high-resolution learning image so that the pixel values are consistent with each other, and as in Mathematical expression 6 below, it is defined as calculating a difference between a down-sampled (S) version of the original high-resolution learning image and the high-resolution converted image.

$$\mathcal{L}_{pix}^{LH} = \frac{1}{n_H}\sum_{i=1}^{n_H}\left\|\hat{x}_H^i - x_H^i\right\|_2^2, \qquad \text{[Mathematical expression 6]}$$

$$\text{where } \hat{x}_H^i = G_{LH}(\hat{x}_L^i)$$

Here, $$\mathcal{L}_{pix}^{HL}$$

is a pixel consistency resultant value of the high-resolution converted image.

Meanwhile, for learning of the low-resolution image classifier 240 and the high-resolution image classifier 280, a modified GAN loss function is defined, and by iterative sequential learning of the generator and the classifier, the low-resolution image generator 220 that generates an actual low-resolution face image can be learned.

The modified GAN loss function for learning of the low-resolution image classifier 240 is as in Mathematical expression 7 below.

$$\mathcal{L}_{D_{HL}}^{HL} = \mathop{\mathbb{E}}_{x_L^i \sim \mathbb{P}_L^r}\left[\min\left(0, -1 + D_{HL}(x_L^i)\right)\right] + \qquad \text{[Mathematical expression 7]}$$
$$\mathop{\mathbb{E}}_{\hat{x}_L^i \sim \mathbb{P}_L^g}\left[\min\left(0, -1 - D_{HL}(\hat{x}_L^i)\right)\right],$$

The modified GAN loss function for learning of the high-resolution image classifier 280 is as in Mathematical expression 8 below.

$$\mathcal{L}_{D_{HL}}^{HL} = \mathop{\mathbb{E}}_{x_L^i \sim \mathbb{P}_H^r}\left[\min\left(0, -1 + D_{LH}(x_H^i)\right)\right] + \qquad \text{[Mathematical expression 8]}$$
$$\mathop{\mathbb{E}}_{\hat{x}_H^i \sim \mathbb{P}_H^g}\left[\min\left(0, -1 - D_{LH}(\hat{x}_H^i)\right)\right],$$

Figure 3:
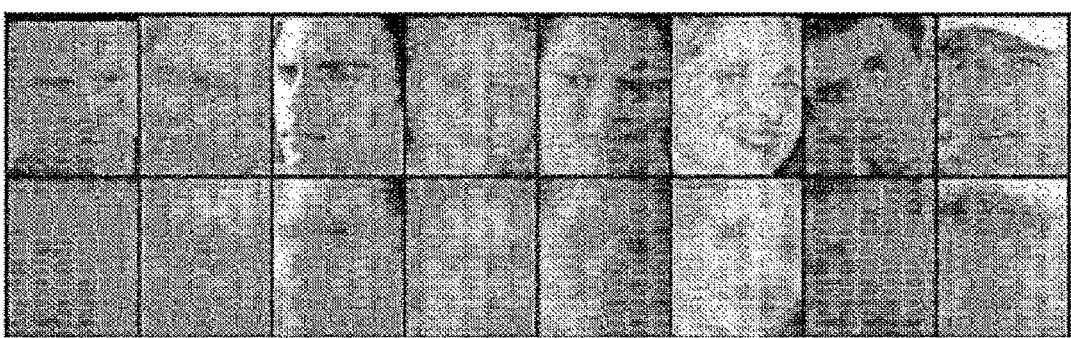
FIG. 3 is a reference diagram explaining examples of low-resolution face images generated by a low-resolution face image generator according to an embodiment of the present disclosure.
Figure 4:
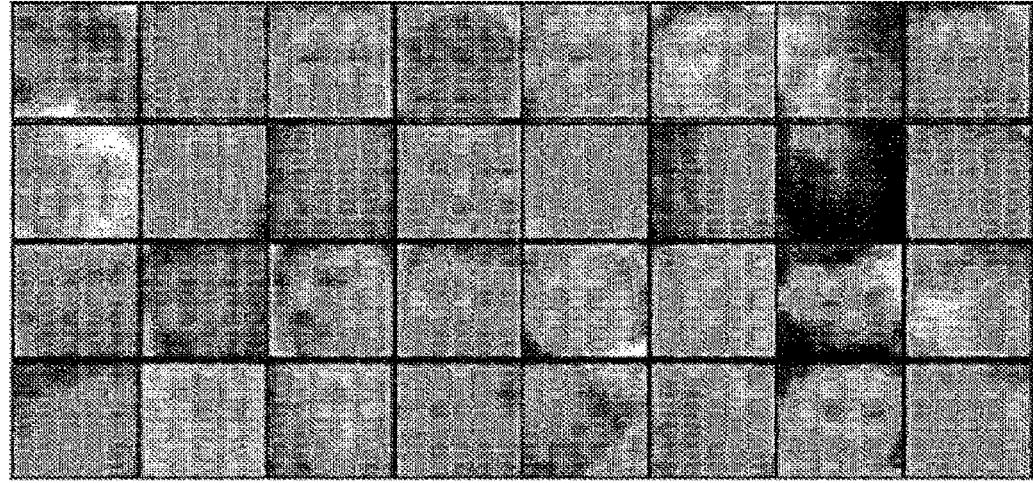
FIG. 4 is a reference diagram explaining examples of low-resolution face images obtained in an actual environment according to an embodiment of the present disclosure.

Examples of images generated by the low-resolution image generator 220 learned through this are shown in FIG. 3, and it can be seen that the low-resolution face images obtained in an actual environment show image characteristics similar to those of FIG. 4.

Figures 5, 6:
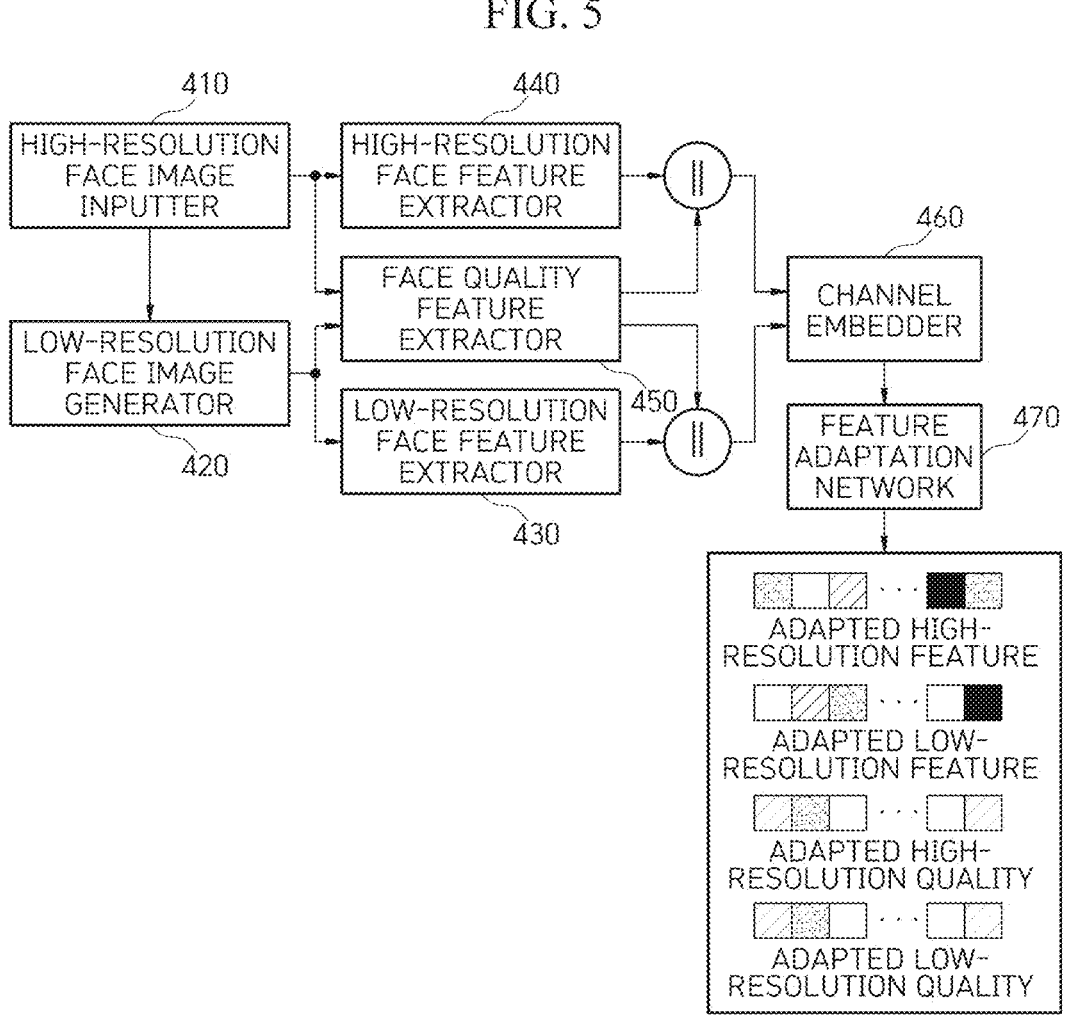
FIG. 5 is a reference diagram explaining a feature adaptation network learning structure based on face quality estimation according to an embodiment of the present disclosure.
FIG. 6 is a configuration block diagram explaining a detailed configuration of a face quality feature extractor of FIG. 5.

FIG. 5 is a configuration block diagram explaining an adaptive model learning device of a low-resolution face recognition device according to an embodiment of the present disclosure.

The adaptive model learning device of the low-resolution face recognition device according to an embodiment of the present device is a device that keeps distinctiveness while reducing a feature gap when high-resolution/low-resolution face images paired with each other are given.

As illustrated in FIG. 5, the adaptive model learning device of the low-resolution face recognition device according to an embodiment of the present device includes a high-resolution learning image inputter 410, a low-resolution face image generator 420, a low-resolution face feature extractor 430, a high-resolution face feature extractor 440, a face quality feature extractor 450, a channel embedder 460, and a feature adaptation network 470.

The high-resolution learning image inputter 410 inputs a pre-registered high-resolution learning face image to the low-resolution face image generator 420, the high-resolution face feature extractor 440, and the face quality feature extractor 450.

The low-resolution face image generator 420 generates a low-resolution converted face image by using the input high-resolution learning face image, and inputs the generated low-resolution converted face image to the face quality feature extractor 450 and the low-resolution face feature extractor 430.

The low-resolution face feature extractor 430 extracts a low-resolution face feature from the input low-resolution converted face image.

The high-resolution face feature extractor 440 extracts a high-resolution face feature from the input high-resolution learning face image.

The face quality feature extractor 450 extracts face quality features by using the input high-resolution face image and the generated low-resolution converted face image, computes the respective extracted face quality features with a predetermined function, and provides a face quality resultant value depending on whether the computation result is a high-resolution image or a low-resolution image.

The channel embedder 460 merges a high-resolution concatenate value, obtained by concatenating the high-resolution face feature and the face quality resultant value calculated through the face quality feature extractor 450, with a low-resolution concatenate value obtained by concatenating the low-resolution face feature and the face quality resultant value calculated through the face quality feature extractor 450.

The feature adaptation network 470 processes a feature of an adapted resolution and a quality by using the high-resolution concatenate value and the low-resolution concatenate value.

As illustrated in FIG. 6, the low-resolution face image generator 420 as learned above generates a low-resolution converted image that is paired with a high-resolution face image, and extracts face features from respective images. In this case, a feature having rich expressiveness reflecting various textures is extracted as the high-resolution face feature, and a feature capable of expressing only overall face shape information is extracted as the low-resolution face feature.

Further, in order to keep the distinctiveness and to adapt the high-resolution face feature and the low-resolution face feature, a balanced feature adaptation method based on a face quality is proposed, and for this, the face features pass through the face quality feature extractor 450 that extracts the features related to the face quality.

After the features related to the face quality is concatenated in a channel direction, information is merged through the channel embedder, and passes through the feature adaptation network 470, so that the adapted face features of the respective resolution domains and the face quality features are obtained.

The face quality feature extractor 450 as above calculates the face quality resultant value in accordance with the resolution by performing a SoftMax function operation (Qs) on the extracted face quality features. The face quality feature extractor 450 returns "1" if the face quality resultant value is the high-resolution image, and returns "0" if the face quality resultant value is the low-resolution image.

In an embodiment of the present disclosure, in order to learn the feature adaptation network 470 that obtains the face quality features, the feature adaptation network is composed of a cross-entropy loss function for well classifying face identities, a loss function for minimizing a distance between the adapted features, a KL divergence loss function for performing learning so that that logic value of the adapted feature is consistent with the logic value of the high-resolution face image feature having a lot of information, and a quality translation loss function for making the quality scores for the high-resolution/low-resolution images "1" and "0" and determining the quality scores for the adapted features by a parameter ($\gamma$).

First, as in Mathematical expression 9 below, the cross-entropy loss function is defined as cross-entropy of information on a class inferred from the feature $$\left(f_H^i\right)$$

extracted from the high-resolution image and the actual class $$\left(y_c^i\right),$$

$$\mathcal{L}_{ce} = \frac{1}{n_H C} \sum_{\forall i} \sum_{\forall c} y_c^i \log p\left(f_H^i\right)_c \qquad \text{[Mathematical expression 9]}$$

Here, $\mathcal{L}_{cc}$ is a cross-entropy loss function.

A distance minimization loss function for minimizing a distance between adapted high-resolution/low-resolution image features $$\left(\tilde{f}_H^i, \tilde{f}_L^i\right)$$

is defined as in Mathematical expression 10 below.

$$\mathcal{L}_{feat} = \frac{1}{n_H} \sum_{\forall i} \left\| \tilde{f}_L^i - \tilde{f}_H^i \right\|_2^2 \qquad \text{[Mathematical expression 10]}$$

Here, $\mathcal{L}_{feat}$ is a distance minimization loss function.

Further, the KL divergence loss function is defined as in Mathematical expression 11 below.

$$\mathcal{L}_{kld} = \frac{1}{2n_H} \qquad \text{[Mathematical expression 11]}$$

$$\sum_{\forall i} \left[ p\left(f_H^i\right) \log \frac{p\left(f_H^i\right)}{p\left(\tilde{f}_H^i\right)} + p\left(f_H^i\right) \log \frac{p\left(f_H^i\right)}{p\left(\tilde{f}_L^i\right)} \right]$$

Last, a quality translation loss function for making the quality scores for the high-resolution/low-resolution images "1" and "0" and determining the quality scores for the adapted features by a parameter is defined as in Mathematical expression 12 below.

$$\mathcal{L}_{qual} = \qquad \text{[Mathematical expression 12]}$$

$$\frac{1}{2n_H} \sum_{\forall i} \left[ \left\{ Q_s\left(q_H^i\right) - 1 \right\}^2 + \left\{ Q_s\left(q_L^i\right) \right\}^2 \right] + \frac{1}{n_H}$$

$$\sum_{\forall i} \left[ Q_s\left(\tilde{q}_H^i\right) - \left\{ \gamma Q_s\left(q_H^i\right) + (1 - \gamma) Q_s\left(q_L^i\right) \right\} \right]^2 +$$

$$\frac{1}{n_H} \sum_{\forall i} \left[ Q_s\left(\tilde{q}_L^i\right) - \left\{ \gamma Q_s\left(q_H^i\right) + (1 - \gamma) Q_s\left(q_L^i\right) \right\} \right]^2$$

Here, $\mathcal{L}_{qual}$ is a quality translation loss function.

Meanwhile, the low-resolution face feature extractor 430 utilizes pre-learned models, and parameters are not updated.

Further, the high-resolution face feature extractor 440, the face quality feature extractor 450, the channel embedder 460, and the feature adaptation network 470 are learned by the above-described four loss functions.

Meanwhile, the features extracted by the learned feature adaptation network 470 represent consistent features without distinguishing the resolutions.

In particular, by adjusting the quality translation loss function by the parameters, the feature of the high-resolution face image having rich information is not adapted for the low-resolution face image feature domain having insufficient information, but can be adapted as a balanced feature.

Finally, in a test step against the low-resolution face image input, adapted features are obtained by the feature adaptation network 470 from two kinds of features extracted from the high-resolution face feature extractor 440 and the face quality feature extractor 450, and a matching-based face recognition is performed based on the obtained features.

According to an embodiment of the present disclosure, a balanced feature adaptation method is also proposed based on the face quality in order to keep distinctiveness and to adapt the high-resolution/low-resolution face features, and for this, a structure is configured, in which the features related to the face quality are extracted through the face quality feature extractor 450, the features related to the face feature and the quality are concatenated in the channel direction, information is merged through the channel embedder 460, and the adapted face features and face quality features of the respective resolution domains are obtained through the feature adaptation network 470.

In summary, the learning device is composed of the low-resolution image generator 220 for modeling the actual low-resolution face image by using high-resolution/low-resolution face image data that are not paired with each other, the high-resolution image generator 260, the low-resolution image classifier 240 for distinguishing the generated image from the original image domain, the high-resolution image classifier 280, and the face feature extractors 220 and 230 for keeping the face identity features.

Figure 7:
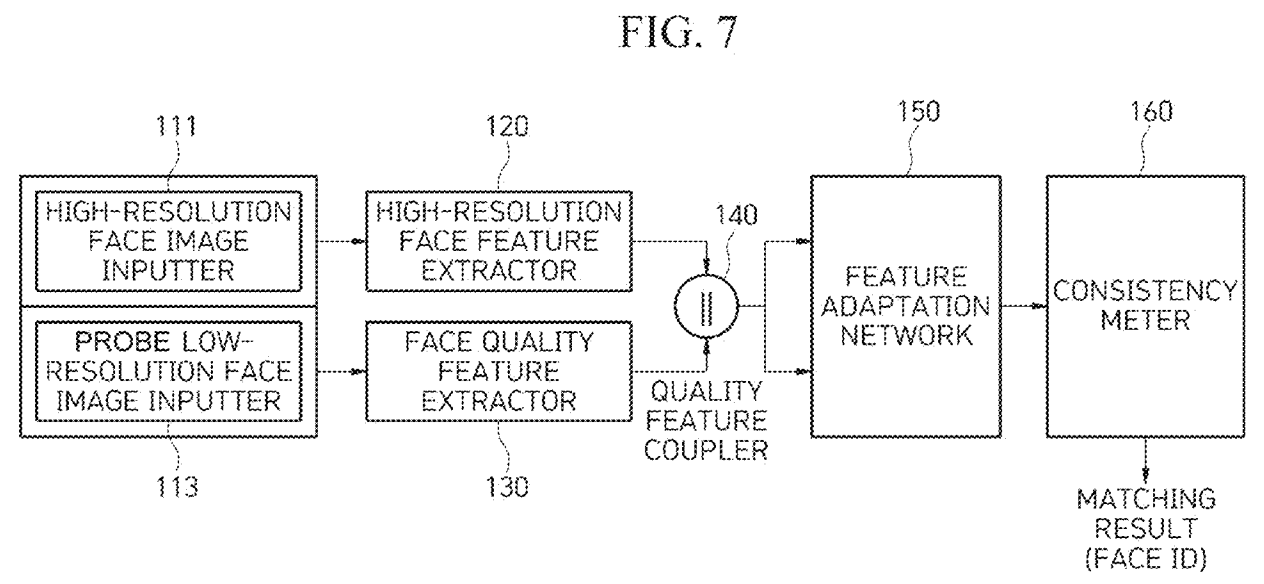

As illustrated in FIG. 7, a low-resolution face recognizer learning device according to an embodiment of the present disclosure includes a high-resolution image inputter 111, a probe low-resolution image inputter 113, a high-resolution face feature extractor 120, a face quality feature extractor 130, a feature combiner 140, a feature adaptation network 150, and a consistency meter 160.

The high-resolution image inputter 111 inputs high-resolution images including a pre-registered face to the face quality feature extractor 130 and the feature combiner 140. Here, the high-resolution images input through the high-resolution image inputter 111 are a set of portraits pre-registered in the database.

The probe low-resolution image inputter 113 inputs low-resolution images including a face, which is an image that is an actual face recognition target, to the face quality feature extractor 130 and the feature combiner 140. Here, the low-resolution image is an image captured through the CCTV.

The high-resolution face feature extractor 120 extracts the high-resolution face feature and the low-resolution face feature by using the input high-resolution image and the input low-resolution image. Here, the high-resolution image is an image having a higher resolution than the resolution of the low-resolution image.

The high-resolution face feature is a feature having rich expressiveness reflecting various textures, and the low-resolution face feature is a feature capable of expressing only overall face shape information.

The face quality feature extractor 130 extracts the face quality feature by using the input high-resolution image and the input low-resolution image. The face quality feature extractor 130 extracts the respective face quality features by using the input high-resolution face image and the generated low-resolution converted fact image, and calculates the face quality resultant value in accordance with the resolution by performing the SoftMax function operation (Qs) on the extracted face quality feature. The face quality feature extractor 130 returns "1" if the face quality resultant value is the high-resolution image, and returns "0" if the face quality resultant value is the low-resolution image.

The feature combiner 140 provides a high-resolution face feature by concatenating the high-resolution face feature and the face quality feature, and provides a low-resolution face feature by concatenating the low-resolution face feature and the face quality feature.

The feature adaptation network 150 extracts a high-resolution face feature map and a low-resolution face feature map by using the concatenated high-resolution face feature and low-resolution face feature, respectively. In this case, deep networks, such as generative adversarial networks (GANs) extracting face feature maps or autoregressive models, may be used.

The consistency meter 160 measures the consistency of the low-resolution face feature map by using the extracted high-resolution face feature map and low-resolution face feature map, and determines a face ID. The consistency meter 160 returns the face recognition matching result to the smallest-distanced high-resolution ID (face feature) by consistency measurement (Euclidean distance and cosine distance) between a high-resolution face feature vector and a low-resolution face feature vector.

Hereinafter, a face image recognizer learning method according to an embodiment of the present disclosure will be described with reference to FIGS. 8 and 9.

First, an image inputter inputs a high-resolution learning image and a low-resolution learning image each including a pre-registered face (S100).

Then, a low-resolution image generator generates a low-resolution converted image from the input high-resolution learning image (S200).

Thereafter, a low-resolution face feature extractor extracts a high-resolution face feature from the input high-resolution learning image, and extracts a low-resolution face feature from the generated low-resolution converted image (S300).

Further, a low-resolution image classifier classifies the generated low-resolution converted image and the input low-resolution learning image (S400).

Then, a high-resolution image generator generates a low-resolution converted image by using the generated high-resolution learning image (S500).

Thereafter, a high-resolution face feature extractor extracts the high-resolution face feature from the generated high-resolution converted image, and extracts the high-resolution face feature from the input high-resolution learning image (S600).

A high-resolution image classifier classifies the generated high-resolution converted image and the high-resolution learning image (S700).

Thereafter, a first perceptual loss function uses the extracted high-resolution face feature and the extracted low-resolution face feature to make the two face features equal to each other so that the two face features are distinguished as the same person (S810).

A first GAN loss function processes the classified low-resolution converted image and low-resolution learning image so that the low-resolution converted image and low-resolution learning image are not distinguished from each other (S820).

A first pixel consistency loss function processes pixel values between the input high-resolution learning image and the generated low-resolution converted image so that the pixel values are consistent with each other (S830).

The low-resolution image generator is learned through the first perceptual loss function, the first GAN loss function, and the first pixel consistency loss function (S840).

Further, a second perceptual loss function uses the input high-resolution face feature and the extracted high-resolution converted face feature to make the two face features equal to each other so that the two face features are distinguished as the same person (S850).

A second GAN loss function processes the classified high-resolution converted image and high-resolution learning image so that the high-resolution converted image and high-resolution learning image are not distinguished from each other (S860).

A second pixel consistency loss function processes pixel values between the classified high-resolution converted image and high-resolution learning image so that the pixel values are consistent with each other (S870).

The high-resolution image generator is learned through the second perceptual loss function, the second GAN loss function, and the second pixel consistency loss function (S880).

The low-resolution image classifier is learned through the first GAN loss function, and the high-resolution image classifier is learned through the second GAN loss function (S900).

Hereinafter, an adaptive model learning method of a face image recognizer according to an embodiment of the present disclosure will be described with reference to FIG. 10.

First, a high-resolution learning image inputter inputs a pre-registered high-resolution learning face image (S1010).

A low-resolution image face generator generates a low-resolution converted face image by using the input high-resolution learning face image (S1020).

A low-resolution face feature extractor extracts a low-resolution face feature from the input low-resolution converted face image (S1030). The generating of the low-resolution face image generates the low-resolution converted image paired with the high-resolution face image, and extracts the face features from the respective images.

A high-resolution face feature extractor extracts a high-resolution face feature from the input high-resolution learning face image (S1040).

A face quality feature extractor extracts face quality features by using the input high-resolution face image and the generated low-resolution converted face image, computes the respective extracted face quality features with a predetermined function, and provides a face quality resultant value depending on whether the computation result is a high-resolution image or a low-resolution image (S1050). The extracting of the face quality features calculates the face quality resultant value in accordance with the resolution by performing the SoftMax function operation (Qs) on the extracted face quality feature.

A channel embedder merges a high-resolution concatenate value, obtained by concatenating the high-resolution face feature and the face quality resultant value calculated through the face quality feature extractor, with a low-resolution concatenate value obtained by concatenating the low-resolution face feature and the face quality resultant value calculated through the face quality feature extractor (S1060).

A feature adaptation network generates a feature of an adapted resolution and a quality face feature map by using the high-resolution concatenate value and the low-resolution concatenate value (S1070).

Accordingly, according to an embodiment of the present disclosure, the adapted high-resolution face feature, the adapted low-resolution face feature, the adapted high-resolution face quality, and the adapted low-resolution face quality are learned and stored in the database.

Each step included in the method described above may be implemented as a software module, a hardware module, or a combination thereof, which is executed by a computing device.

Also, an element for performing each step may be respectively implemented as first to two operational logics of a processor.

The devices, apparatuses, units, modules, and components described herein with respect to FIGS. 1-7 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Figure 9:
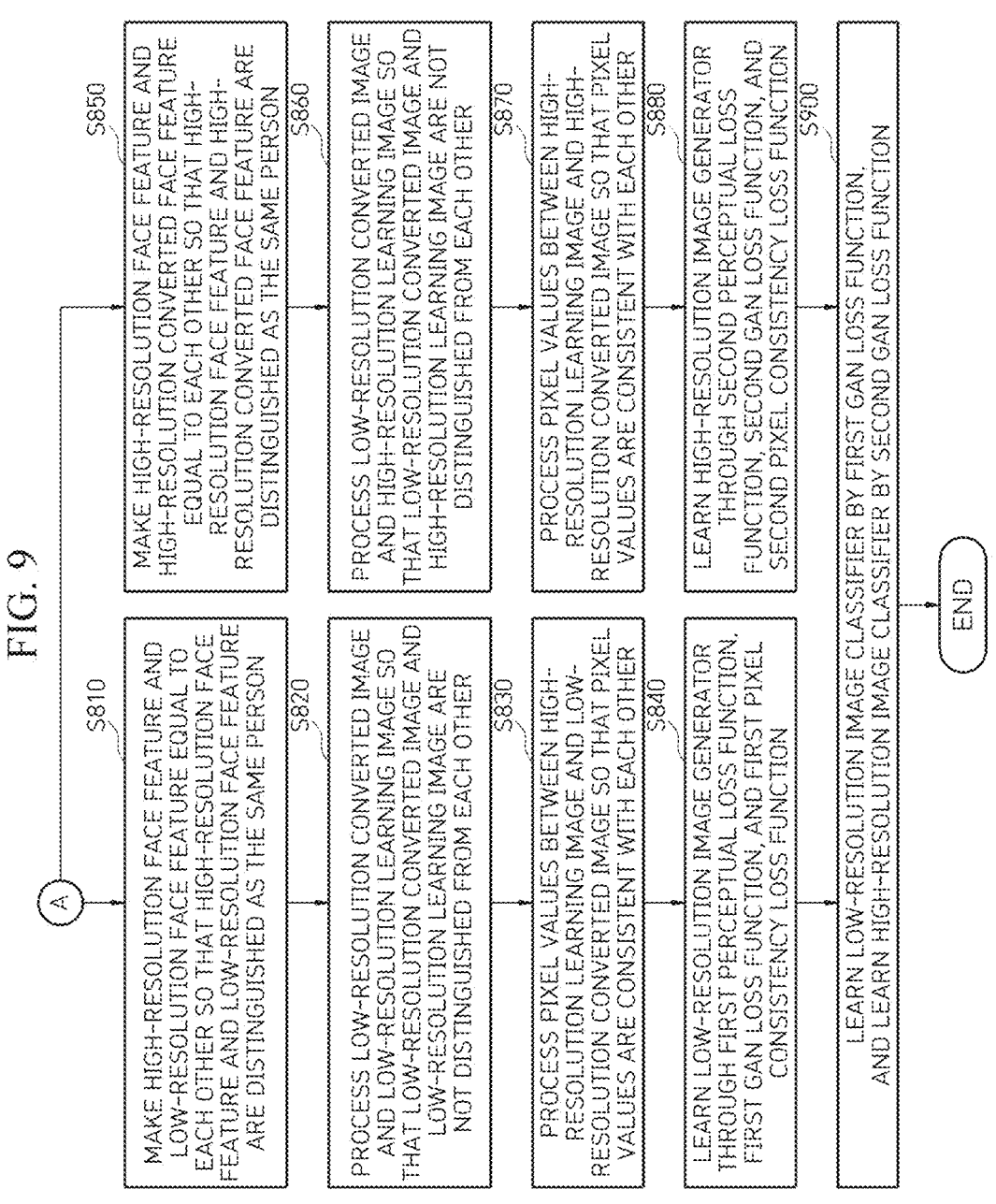

The methods that perform the operations described in this application, and illustrated in FIGS. 8-10, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMS, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

As described above, although the configuration of the present disclosure has been described in detail with reference to the accompanying drawings, it can be understood by those skilled in the art to which the present disclosure pertains that the present disclosure can be variously changed and modified within a range of technical spirit of the present disclosure. Accordingly, the protection range of the present disclosure should not be limited to the above-described embodiments, but should be determined by the description of the appended claims.

What is claimed is:

1. A face image recognizer learning device comprising:

an image inputter configured to input a high-resolution learning image and a low-resolution learning image each including a pre-registered face;

a low-resolution image generator configured to generate a low-resolution converted image from the high-resolution learning image input by the image inputter;

a low-resolution face feature extractor configured to extract a high-resolution face feature from the high-resolution learning image input by the image inputter and to extract a low-resolution face feature from the generated low-resolution converted image;

a low-resolution image classifier configured to distinguish the low-resolution converted image generated through the low-resolution image generator and the low-resolution learning image input by the image inputter from each other;

a high-resolution image generator configured to generate a high-resolution converted image by using the low-resolution converted image generated through the low-resolution image generator;

a high-resolution face feature extractor configured to extract a first high-resolution face feature from the high-resolution converted image generated through the high-resolution image generator and to extract a second high-resolution face feature from the high-resolution learning image input by the image inputter; and a high-resolution image classifier configured to distinguish the high-resolution converted image generated through the high-resolution image generator and the high-resolution learning image input by the image inputter from each other;

a first perceptual loss function for distinguishing a same person by making the extracted low-resolution face feature and at least one of the first high-resolution face feature or the second high-resolution face feature equal to each other;

a first GAN loss function for processing the generated low-resolution converted image and low-resolution learning image input by the image inputter so that the generated low-resolution converted image and the low-resolution learning image input by the image inputter are not distinguished from each other; and a first pixel consistency loss function for processing pixel values of the high-resolution learning image input by the image inputter and the generated low-resolution converted image so that the pixel values are consistent with each other;

wherein the low-resolution image generator is learned through the first perceptual loss function, the first GAN loss function, and the first pixel consistency loss function;

a second perceptual loss function to distinguish the same person by making the first high-resolution face feature and the second high-resolution face feature equal to each other;

a second GAN loss function for separating the generated high-resolution converted image and the high-resolution learning image input by the image inputter from each other; and a second pixel consistency loss function for processing pixel values of the generated high-resolution converted image and the high-resolution learning image input by the image inputter so that the pixel values are consistent with each other;

wherein the high-resolution image generator is learned through the second perceptual loss function, the second GAN loss function and the second pixel consistency loss function; and wherein the low-resolution image classifier is learned by using the first GAN loss function.

2. A face image recognizer learning method comprising:

inputting, by an image inputter, a high-resolution learning image and a low-resolution learning image each including a pre-registered face;

generating, by a low-resolution image generator, a low-resolution converted image from the high-resolution learning image input by the image inputter;

extracting, by a low-resolution face feature extractor, a high-resolution face feature from the high-resolution learning image input by the image inputter, and extracting a low-resolution face feature from the generated low-resolution converted image;

distinguishing, by a low-resolution image classifier, the generated low-resolution converted image and the low-resolution learning image input by the image inputter from each other;

generating, by a high-resolution image generator, a high-resolution converted image by using the generated low-resolution converted image;

extracting, by a high-resolution face feature extractor, a first high-resolution face feature from the generated high-resolution converted image, and extracting a second high-resolution face feature from the high-resolution learning image input by the image inputter;

distinguishing, by a high-resolution image classifier, the generated high-resolution converted image and the high-resolution learning image input by the image inputter from each other;

using a first perceptual loss function to distinguish a same person by making the extracted low-resolution face feature and at least one of the first high-resolution face feature or the second high-resolution face feature equal to each other;

processing, by a first GAN loss function, the generated low-resolution converted image and low-resolution learning image input by the image inputter so that the generated low-resolution converted image and the low-resolution learning image input by the image inputter are not distinguished from each other;

processing, by a first pixel consistency loss function, pixel values of the high-resolution learning image input by the image inputter and the generated low-resolution converted image so that the pixel values are consistent with each other;

learning the low-resolution image generator through the first perceptual loss function, the first GAN loss function, and the first pixel consistency loss function;

using a second perceptual loss function to distinguish the same person by making the first high-resolution face feature and the second high-resolution face feature equal to each other;

processing, by a second GAN loss function, the generated high-resolution converted image and the high-resolution learning image input by the image inputter so that the generated high-resolution converted image and the high-resolution learning image input by the image inputter are not distinguished from each other;

processing, by a second pixel consistency loss function, pixel values of the generated high-resolution converted image and the high-resolution learning image input by the image inputter so that the pixel values consistent with each other; and learning the high-resolution image generator through the second perceptual loss function, the second GAN loss function, and the second pixel consistency loss function.

3. The face image recognizer learning method of claim 2, comprising learning the low-resolution image classifier by using the first GAN loss function.

4. The face image recognizer learning method of claim 2, comprising learning the high-resolution image classifier by the second GAN loss function.

5. The face image recognizer learning method of claim 2, comprising:

inputting, by a high-resolution learning image inputter, a pre-registered high-resolution learning face image;

generating, by a low-resolution image face generator, a low-resolution converted face image by using the high-resolution learning face image input by the high-resolution learning image inputter;

extracting, by a low-resolution face feature extractor, a low-resolution face feature from the generated low-resolution converted face image;

extracting, by a high-resolution face feature extractor, a third high-resolution face feature from the high-resolution learning face image input by the high-resolution learning image inputter;

extracting, by a face quality feature extractor, face quality features by using the input high-resolution face image input by the high-resolution learning image inputter and the generated low-resolution converted face image, computing respective extracted face quality features with a predetermined function, and providing a face quality resultant value depending on whether a computation result is a high-resolution image or a low-resolution image;

merging, by a channel embedder, a high-resolution concatenate value, obtained by concatenating the third high-resolution face feature and the face quality resultant value calculated through the face quality feature extractor, with a low-resolution concatenate value obtained by concatenating the low-resolution face feature and the face quality resultant value calculated through the face quality feature extractor; and generating, by a feature adaptation network, a feature of an adapted resolution and a quality face feature map by using the high-resolution concatenate value and the low-resolution concatenate value.

6. The face image recognizer learning method of claim 5, wherein the generating of the low-resolution converted face image generates a low-resolution converted image paired with a high-resolution face image, and extracts face features from the low-resolution converted image and the high-resolution face image.

7. The face image recognizer learning method of claim 5, wherein the extracting of the face quality features calculates a face quality resultant value in accordance with a corresponding resolution by performing a SoftMax function operation (Qs) on an extracted face quality feature.

* * * * *